Figure 1:
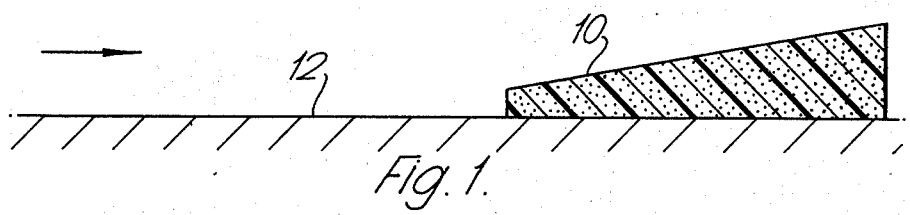

United States Patent [19]
Ogden

[11] 3,967,704
[45] July 6, 1976

[54] VEHICLE DECELERATING MEANS
[75] Inventor: Dennis Henry Ogden, Wolverhampton, England
[73] Assignee: British Industrial Plastics Limited, Manchester, England
[22] Filed: Dec. 14, 1971
[21] Appl. No.: 207,947

[30] Foreign Application Priority Data
Oct. 7, 1968 United Kingdom............47410/68

Related U.S. Application Data
[63] Continuation-in-part of Ser. No. 863,899, Oct. 6, 1969, abandoned.

[52] U.S. Cl............................... 188/32; 188/1 C; 244/110 R; 260/2.5 F; 260/2.5 FP
[51] Int. Cl.² ......................................... B60T 1/04
[58] Field of Search......................... 188/1 C, 4, 32; 260/2.5 F, 2.5 FP; 161/78, 79; 117/161 LN, 123 D; 94/19; 244/114 R, 110 R

[56] References Cited
UNITED STATES PATENTS
3,066,896   12/1962   Schirtzinger................... 244/114 R
3,091,551   5/1963   Robertson................... 117/123 D X
3,393,161   7/1968   Avis et al. ....................... 260/2.5 F FOREIGN PATENTS OR APPLICATIONS
1,092,255   11/1967   United Kingdom............. 244/110 R Primary Examiner—George E. A. Halvosa
Attorney, Agent, or Firm—Cushman, Darby & Cushman

[57] ABSTRACT

This invention provides a safety device for quickly arresting the movement of vehicles such as aeroplanes and motor cars by forming a retarding bed of crushable material adjacent to a vehicle track. A foam is formed from an aminoplast resin composition and layed down in a bed adjacent to the vehicle track where it is cured in situ to produce a non-resilient cured foam body having a compressive strength between 15 and 50 p.s.i. and a density from 0.25 to 10 pounds per cubic foot.

12 Claims, 8 Drawing Figures

VEHICLE DECELERATING MEANS

This application is a continuation-in-part of U.S. patent application Ser. No. 863,899 filed on Oct. 6, 1969, now abandoned.

This invention relates to means for decelerating aircraft and other vehicles.

British Pat. Specification No. 1,092,255 describes a method of arresting aircraft if they overrun the end or run off the site of a runway, and of retarding motor cars or other vehicles that run off a road or race track. The method described in that specification involves providing a bed of crushable rigid foamed material, such as an aerated concrete or plaster, extending across the end of, or along the side of, a vehicle track such as an aircraft runway or a road. The strength of the foamed material used must be such that the wheels of the vehicle running off the track and on to the bed will crush the foamed material, the effect of this being to exert a drag on the wheels, so slowing the vehicle down. Aerated concrete having a density between 15 and 60 lb. per cu. ft. and a compressive strength of 40 to 200 lb. per sq. in. is described as being suitable, although for retarding road vehicles concrete having a low density (e.g. 15 to 20 lb. per cu. ft.) and a low compressive strength (e.g. 40-50 lb. per sq. in.) may be adequate.

I have now found that certain cured aminoplast resin foams may be employed with advantage as a crushable foamed material used for example as described above to retard the travel of aircraft overrunning airstrips and of motor vehicles straying from the road.

According to my invention I provide a method of forming a retarding bed of crushable material adjacent to a vehicle track, comprising the steps of forming a foam from an aminoplast resin composition, laying down said foam in a bed adjacent to the vehicle track and curing the foam in situ to produce a non-resilient, cured foam body having a compressive strength between 15 and 50 p.s.i. and a density of from 0.25 to 10 lb. per cu. ft.

The retarding bed is formed across one end of e.g. a runway or alongside a motorway or racetrack where a runaway aircraft or vehicle leaves the runway or other vehicle track.

"Compressive strength" is defined as the load in p.s.i. required to penetrate the cured foam to a depth equal to 50% of its thickness. Thus, if the load required for 50% penetration is 15 p.s.i., the material has a compressive strength of 15 p.s.i.

By the term "non-resilient" cured foam I mean a cured foam which, after compression to 50% of its original thickness, does not recover to more than 75% of its original thickness. For example, if a cured foam body of thickness 4 inches is compressed to a thickness of 2 inches and the compressive load thereafter removed, and if the foam body then recovers to a thickness of 3½ inches or more, it is not suitable for the purposes of my invention. If, however, the recovery is less than this, then the foam is suitable.

One important advantage of using a cured aminoplast resin foam (hereafter called simply "foam" or "cured foam" for convenience) for this purpose is that should any of the foam, shattered by the impact of the vehicle, be thrown into, say, an air intake of an engine, little damage is likely to ensue in contrast to the effect of a piece of concrete or plaster entering the engine.

Furthermore, we have found that a cured foam having a relatively low density is adequate. Thus, foams having a density of from 0.25 to 10 lb. per cu. ft., preferably of from 0.25 to 5 lb. per cu. ft., are quite satisfactory.

Surprisingly also, and in contrast to what is disclosed in British Pat. Specification No. 1,092,255, we have found that even for the retardation of aircraft, a foam having quite a relatively low compressive strength is effective. Thus a compressive strength between 15 and 50 lb. per sq. in., is adequate. Of course, the speed and weight of the vehicle entering the foam, and the maximum deceleration force which can be tolerated will influence the foam properties required in a given case, but densities and compressive strength within the ranges above specified are usually satisfactory for most applications. In considering the choice of foam properties, the permissible length of foam bed, the effect of brakes on the vehicle itself, etc. will all be taken into consideration.

It will be clear that the function of the foam is ideally to bring about the stopping of a vehicle in the shortest possible distance and at the same time subject the occupants of the vehicle to the least possible injury or shock. It has been calculated that the maximum retardation force which can be withstood by both an aircraft and its passengers without serious damage to either is about 1g, so that a foam which will give, in the particular circumstances, a retardation or deceleration force of 0.7–0.9 g is extremely suitable. Foams having compressive strengths in the range 15 to 50 p.s.i. are suitable for this purpose. This foam is strong enough to carry recovery and rescue vehicles. Weaker foams, e.g. having compressive strengths in the range 1 to 10 p.s.i are suitable for retarding lighter vehicles such as motor cars. It will be appreciated that when we speak here of "lighter" vehicles we mean vehicles which exert less pressure on the foam; it is the loading on unit area of the vehicle in contact with the foam which is the important feature.

Many synthetic resinous materials other than aminoplast resins are capable of forming crushable foams of suitable non-resilience, density and compressive strength, but these materials suffer from significant disadvantages from the viewpoint of flammability and/or cost. Urea/formaldehyde resins are particularly suitable for the invention on the grounds of cost, ready availability and ease of use.

The durability of the foam has also to be taken into consideration, of course, having regard to its mode of use, and suitable measures such as protective coatings to protect it from the elements enable aminoplast resins having normally inferior weather-resistance properties to be satisfactorily employed.

The physical characteristics of the foam are important also. Thus, we have already described the foam in terms of its non-resilient and compressive strength. The foam should also be capable of substantially retaining its integrity (i.e. its size, shape, density, and compressive strength) during a usefully long period of time, and should be able to withstand weathering and bacteria. It must, however, be capable of collapsing under pressures likely to be imposed upon it by a vehicle of the size and wheel loading which it is desired to arrest. When crushing does occur it is essential that actual breaking of the foam occurs, since mere compression of the foam, if it is followed by an elastic expansion, could cause the vehicle, particularly a fast travelling aircraft, to bounce dangerously.

One important advantage of laying a foam bed which is cured in situ is that damage caused to the retarding bed in arresting the movement of a vehicle can readily be repaired by replacing the damaged, cured foam with fresh aminoplast resin foam which is cured in situ in the same way as the original material.

Advantageously, a flame retardant additive may be incorporated into the foam. Suitable additives for this purpose include sulphites, e.g. cyclic organic sulphites, lead sulphite and zinc sulphite, chlorine-containing compounds, e.g. polyvinyl chloride, phosphorus compounds and alumina.

It should be noted that the defined foam densities given above relate to the cured foam alone, excluding any included material, but it will be appreciated that it is possible to produce foams comprising a proportion of material contained in the cavities of the foam, and the presence of such included materials, as other gases, for example carbon dioxide, Freons and bromochlorodifluoromethane (BCF), and liquids, for example water and oil, is not excluded. Such inclusions may be beneficial in that suitable flame-extinguishing agents may be incorporated which, on being released, blanket any fires which may already have broken out, or may effectively prevent subsequent ignition of, say, spilled fuel.

Mention has already been made of the possibility of protecting the cured foam body, which has relatively poor weather resistance, by applying suitably compatible coating materials. For example, a cured urea/formaldehyde foam may not itself have sufficient weather and bacteria resistance for the purposes of the invention, but its useful life can be extended considerably by providing surfaces exposed to weathering and bacteria with a protective covering such as by the application of a suitable paint. Satisfactory paints for this purpose include chlorinated rubber based paints, urethane lacquers, unsaturated polyesters, latex and solvent based air drying paints, bitumen, pitch, heavy oils and chlorinated waxes. An applied paint coating may be brightly coloured to give warning of the whereabouts of the foam retarding bed. Of course, if the paint is an inflammable one, as many are, the foam should also include self-extinguishing additives, as described above.

Deterioration of the foam may also occur by contact with soil or ground water, and if the foam is likely to be exposed to conditions conducive to such deterioration, then, for example, drainage channels and ditches, will normally be provided. Again, the surface of the foam may be contoured so that water falling on it will drain off in a desired direction; for example, on an aircraft runway a high point along the center of the runway, sloping gradually towards the sides, will usually be preferable. Protection of the foam from soil and ground water can be provided, for example, by laying it on an impervious base, and bounding the foam bed along the sides with building sheets such, for example, as polyester/glass fibre sheets.

To reduce the likelihood of a vehicle knocking the foam out of its path on impact, or of strong winds blowing the foam away, the foam bed is preferably secured to the ground. This may be effected by gluing or by the use of pins. In some cases it may be convenient to excavate a piece of ground of the appropriate dimensions and to the desired depth, and to fill the hole so obtained with the foam. For example, in certain circumstances it is desirable for the thickness of the foam to increase gradually away from the vehicle track, i.e. in the likely direction of travel of a runaway vehicle. This is especially so when the foam is below ground level, since otherwise there is a possibility that the vehicle will overturn. Also, with such increasing thickness, a light or slow moving vehicle may be arrested on the shallower part, the thicker section serving to retard heavier and faster machines.

The decelerative effect may also be increased with depth of penetration into the foam bed by employing foams of different densities and compressive strengths at different parts of the bed. For example, a low density, low compressive strength foam could be used at the entry to the bed (e.g. at the end of the normal runway), sufficient perhaps to arrest light vehicles, while further along the bed, a more dense, stronger foam could be used which would more effectively slow down larger, heavier or faster travelling vehicles.

The invention is not, as has already been intimated, restricted to the retardation of aircraft. Retarding beds of foam made in accordance with my invention can be employed in conjunction with roads and race tracks, to arrest vehicles departing from their intended path. In each case, the depth of foam, its compressive strength and density would be determined by experiments to find the most appropriate combination suitable for a particular application.

Broadly speaking, in all cases, the basic method of laying the foam bed and curing it in situ is the same. Because the actual technology of forming a urea/formaldehyde resin foam is well-known this aspect of the operation will not be described in great detail, except insofar as to say that with conventional foaming apparatus it may be necessary to heat the resin solution in order that the higher values of cured foam density can be achieved.

The method of forming the bed of cured foam is generally as follows. Firstly, an area, or preferably a conveniently sized part of this area to be covered with foam, is marked out and enclosed with temporary shuttering walls, for example, of fiber board or timber, the height of the walls being sufficient to give a desired depth of foam bed. Then a foam is prepared from an aminoplast resin such as urea/formaldehyde, using conventional apparatus, for example, by forcing a resin stream admixed with compressed air through a column containing small glass spheres. The foam is then mixed in the usual way with a stream of an aqueous hardener solution and the resulting mixture fed by means of a flexible hose to a delivery nozzle. Alternatively, the stream of hardener may be foam and mixed with resin or it may be advantageous to form both the resin stream and the hardener stream and mix the two foams, as is described in Canadian Pat. No. 876,146.

This nozzle is then traversed by hand over the area to be covered until a foam bed of the desired depth has been built up. Gelling of the resin usually occurs fairly rapidly, and certainly within an hour or so the shuttering can be removed and re-located so as to enable the remainder of the designated area to be covered.

In this way large foam beds can be built up relatively quickly in sections. This technique, of course, permits a single foam bed to include sections of different thickness, different foam density, or different compressive strength as may be desired. Although the foam gels fairly rapidly and is then strong enough to permit removal of the shuttering it is not at once usable to arrest a vehicle. However, the resin curing process is sufficiently rapid for the bed to be usable within a day or so. Likewise, a damaged foam bed can be very quickly made good again.

The ease with which the foam beds can be made and cured in situ is an important feature of the invention.

Figure 6:
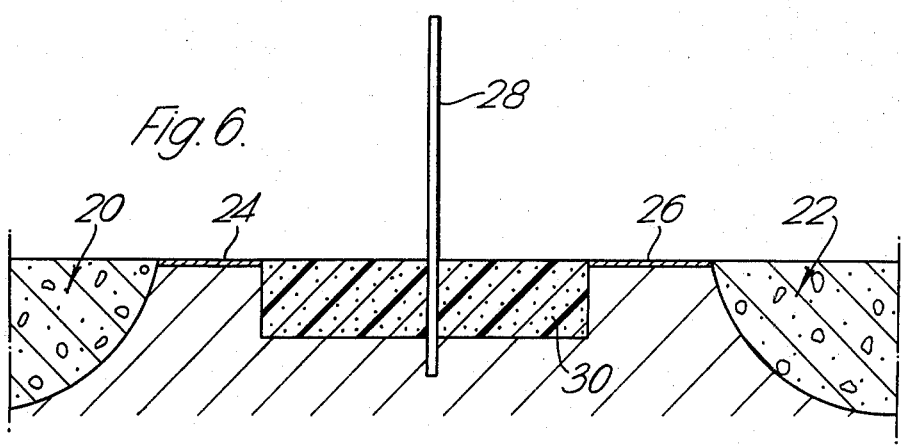

In the accompanying drawings,

FIGS. 1 to 5, 7 and 8 are diagrammatic sectional elevations of an airfield runway showing the use of different configurations of foam bed. FIG. 6 is a diagram of part of a motorway showing the central reservation and parts of the carriageways on either side thereof. All illustrate foam beds which were prepared from a urea/formaldehyde resin.

Figure 2:
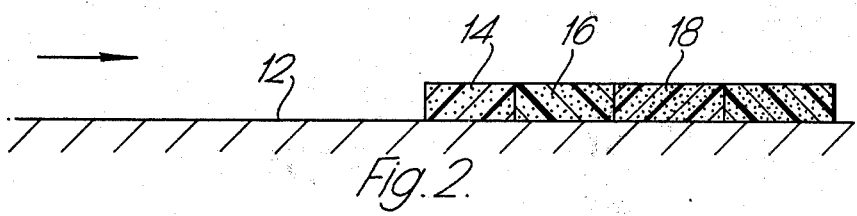

Referring to FIG. 1, a bed of foam 10 is secured to the ground at the end of a runway 12. The arrow shows the direction of approach of the aircraft. In FIG. 2 the foam bed is composed of distinct sections, 14, 16, 18, etc., of varying densities and compressive strengths.

Figure 3:
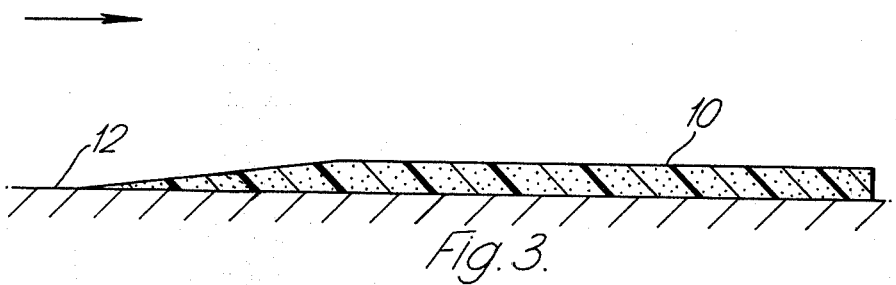

In FIG. 3 the bed is shown as increasing gradually in thickness for the first few yards and then levelling off.

Figure 4:
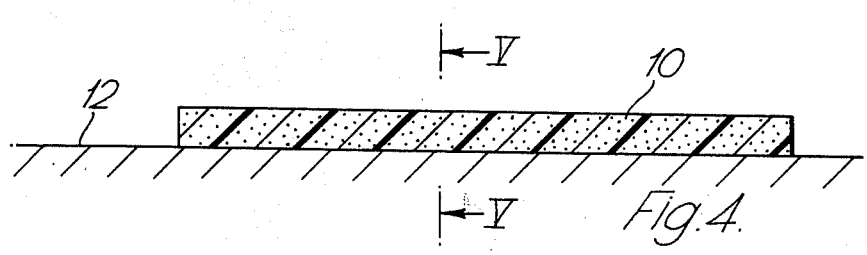
Figure 5:
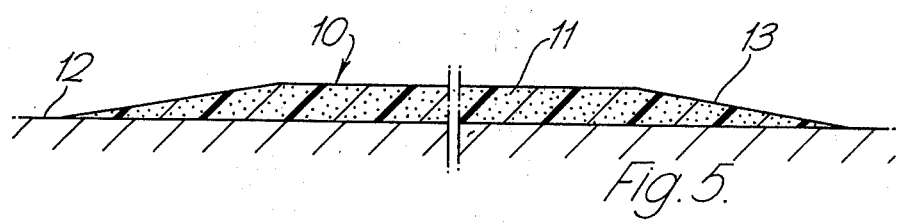

The foam bed shown in FIGS. 4 and 5 (FIG. 5 is a section on the line V—V of FIG. 4) is of uniform thickness longitudinally and has a central portion 11 and sloping sides 13. A bed of this structure has a centralising effect on aircraft using it, the aircraft being retarded more by the thicker central portion, and the sloping sides allow recovery vehicles to run on to the foam bed. Of course, the foam should be strong enough to carry such recovery vehicles.

With reference to FIG. 6 numeral 20 represents, say, a northbound carriageway and numeral 22 a southbound carriageway of a motorway. Between the carriageways 20 and 22 is a central reservation made up of hard shoulder portions 24 and 26 and a central fence 28. A foam bed 30 made in accordance with the invention is situated on either side of the central fence.

Figure 7:
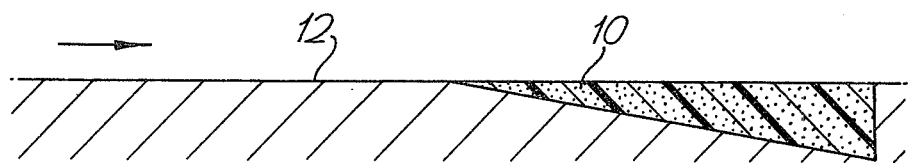
Figure 8:
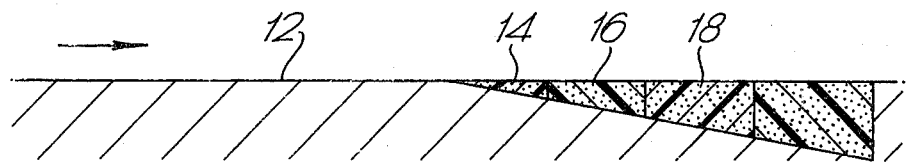

FIG. 7 shows a set-up similar to that of FIG. 1. In this case, however, a piece of ground has been excavated to accommodate the foam bed 10, the upper surface of which therefore represents a continuation of the runway 12. In FIG. 8, the foam bed is composed of a number of distinct sections, 14, 16, 18, etc., of varying densities and compressive strengths.

In an experiment conducted to demonstrate the utility of the invention, "true scale" Lightning and Canberra aircraft (i.e. models in which the wheel dimensions and loading, tyre area, weight distribution and entry speed were all in the correct proportion on the scale 1:9.3) were fired along a runway into a bed of foam at a simulated 75 knots. The foam bed was a cured urea/formaldehyde foam 3 inches thick, 3 feet wide and 45 feet long, having a density, after curing for 1 hour at 120°C, of 9 ozs/cu. ft. and a compressive strength of 2 p.s.i., this thickness and compressive strength having been selected on the same scale as the model aircraft. The density is that which gave the required compressive strength.

Both aircraft stopped within 42 feet, which represented a retardation force attributable to the foam of 0.9 g.

What is claimed is:

1. A method of forming a retarding bed of crushable material adjacent to a vehicle track comprising the steps of forming a foam from an aminoplast resin composition, laying down said foam adjacent to the vehicle track and curing the foam in situ to produce a non-resilient, cured foam body having a compressive strength between 15 and 50 p.s.i. and a density of from 0.25 to 10 lb. per cu. f.t.

2. A method of forming a retarding bed according to claim 1 wherein the density of the cured foam body is from 0.25 to 5 lb. per cu. ft.

3. A method of forming a retarding bed according to claim 1 wherein the foam is layed so that the thickness of the cured foam body increases in the direction away from the vehicle track.

4. A method of forming a retarding bed according to claim 3 wherein a protective covering is applied to the foam body to protect it against external attack and weathering.

5. A method of forming a retarding bed according to claim 3 wherein the foam is prepared from a urea/formaldehyde resin composition.

6. A method of forming a retarding bed according to claim 1 wherein the foam is layed so that the compressive strength and density of the aminoplast foam varies in different parts of the foam body.

7. A method of forming a retarding bed according to claim 6 wherein a protective covering is applied to the foam body to protect it against external attack and weathering.

8. A method of forming a retarding bed according to claim 6 wherein the foam is prepared from a urea/formaldehyde resin composition.

9. A method of forming a retarding bed according to claim 1 wherein a protective covering is applied to the foam body to protect it against external attack and weathering.

10. A method of forming a retarding bed according to claim 1 wherein the foam is prepared from a urea/formaldehyde resin composition.

11. A method of forming a retarding bed according to claim 10 wherein a flame retardent additive is incorporated into the foam.

12. A method of forming a retarding bed according to claim 1 wherein a flame retardent additive is incorporated into the foam.

* * * * *